United States Patent
Takayama

[11] 3,845,992
[45] Nov. 5, 1974

[54] HYDRAULIC PRESSURE CONTROL APPARATUS

[75] Inventor: Katsuki Takayama, Chiryu, Japan

[73] Assignee: Aisin Seiki Kabushiki Kaisha, Aichi Prefecture, Japan

[22] Filed: Mar. 6, 1973

[21] Appl. No.: 338,542

[30] Foreign Application Priority Data
Mar. 14, 1972  Japan............................... 47-25922

[52] U.S. Cl. ............. 303/21 F, 188/181 A, 303/10, 303/21 A, 303/21 AF, 303/21 BE
[51] Int. Cl. .............................................. B60t 8/06
[58] Field of Search ........................ 303/21, 61–63, 303/68–69, 10; 188/181

[56] References Cited
UNITED STATES PATENTS

| | | | |
|---|---|---|---|
| 3,224,278 | 12/1965 | Reid et al. | 303/21 B |
| 3,286,734 | 11/1966 | Hartshorne | 303/21 F |
| 3,382,012 | 5/1968 | Lucien | 303/21 P |
| 3,443,594 | 5/1969 | Frayer | 303/21 F |
| 3,514,161 | 5/1970 | Frayer | 303/21 F |
| 3,640,587 | 2/1972 | Milner et al. | 188/181 A |

*Primary Examiner*—Trygve M. Blix
*Assistant Examiner*—D. C. Butler
*Attorney, Agent, or Firm*—Pierce, Scheffler & Parker

[57] ABSTRACT

A hydraulic pressure control apparatus comprising a servo-valve having an input of a fluid-pressure from a master cylinder proportional to the force applied to a pedal and an output of fluid pressure applied to an actuator with passages from an accumulator to the actuator and from the actuator to a drain, characterized in that the input and the output are opposed to act on a piston therebetween in the valve, the piston having a pressure line formed at the input and the output sides respectively, the pressure lines being functionally connected to an electrical signal assembly so that when the signal assembly is actuated, the pressure varies to activate the piston so as to control the output, thereby modifying the working condition of the actuator to the ideal operation thereof.

4 Claims, 2 Drawing Figures

3,845,992

HYDRAULIC PRESSURE CONTROL APPARATUS

BACKGROUND OF THE INVENTION

The present invention relates to a pressure control apparatus for controlling the brake pressure obtained by depressing the brake pedal of the brake system of the vehicle by means of an electrical signal means to obtain a suitable brake pressure according to the rotational state of the wheels.

Conventionally, in the well-known antiskid devices for controlling the brake pressure by using electrical means, the prevention of the skid has only been effected by reducing the brake pressure by the above-mentioned electrical means just before the rotation of wheels would be locked and then by applying the brake pressure again when the wheels are returned to a normal condition.

SUMMARY OF THE INVENTION

It is, therefore, an object of the present invention to provide a hydraulic pressure control apparatus having a high safety factor which is constituted by a servo-valve for changing the brake pressure not only to a lower hydraulic pressure than that created by the master cylinder but also to a higher pressure than the pressure created by the master cylinder by means of a flapper valve which acts to adjust the brake pressure by means of electrical signals generated according to the rotational state of the vehicle wheels. For example, the present invention can be applied not only to the above-mentioned antiskid apparatus, but also to means for braking by automatically applying the brake pressure by electrical signals generated according to the rotational state of the vehicle wheels in the case that the brake force is insufficient when the driver applies the brakes, and to adjustment means for suitably retaining the distance between cars by controlling the brake force by means of electrical signals without any connection with the driver's intention to apply the brakes.

BRIEF DESCRIPTION OF THE DRAWINGS

Other objects and attendant advantages of the present invention will become more apparent from the following description in connection with the attached drawings, in which.

DETAILED DESCRIPTION OF PREFERRED EMBODIMENT

Figure 1:
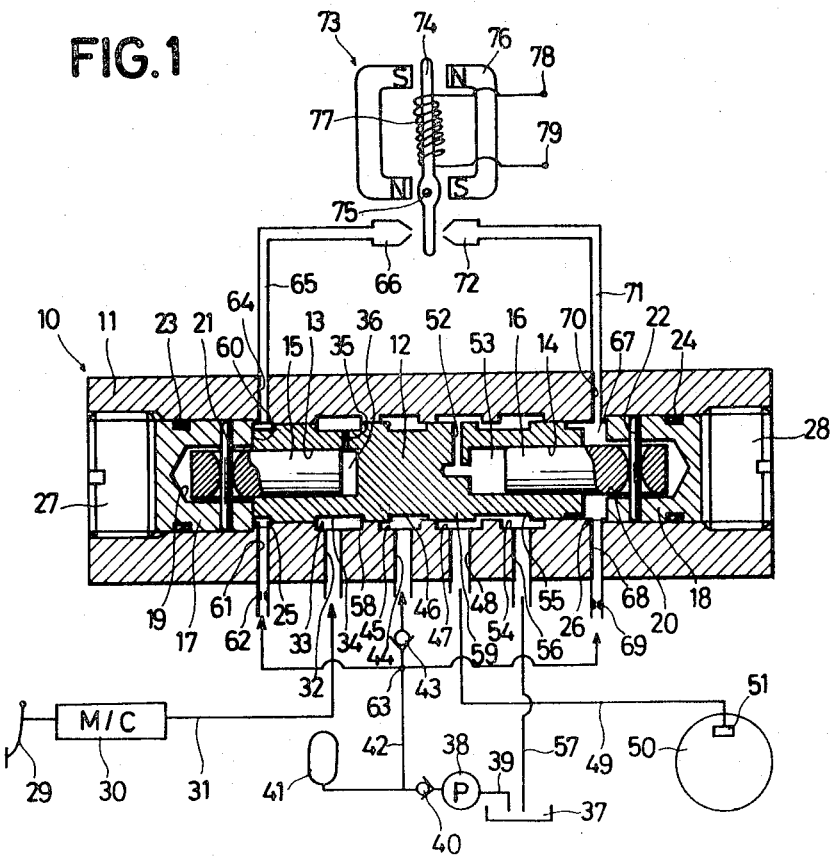
FIG. 1 is a sectional view showing an embodiment of the present invention.

Referring now to the FIG. 1, the numeral 10 denotes a servo valve wherein a piston 12 is slidably fitted within a housing 11 having openings at both ends. At both ends of the piston 12, cylindrical openings 13, 14 are provided within which one end of each of the longitudinal cylindrical members 15, 16 are slidably fitted relative to each other. The other ends of the longitudinal members 15 and 16 are respectively fitted into the cavities 19 and 20 provided in the elements 17 and 18. The elements 17 and 18 are secured to the members 15 and 16 by means of pins 21 and 22 passing radially therethtough. Said piston elements 17, 18 include sealing rings 23, 24 which form a fluid tight seal with said housing 11 and axially movement of the piston elements 17, 18 is limited by offsets 25, 26 in the housing 11. At both ends of the housing 11, plugs 27, 28 are respectively threaded into the openings to contact the outer ends of said elements 17, 18. The numeral 29 indicates a brake pedal. When the brake pedal 29 is depressed, hydraulic pressure from a master cylinder 30 passes through a conduit 31, an inlet 32 in the housing 11 to an annular groove 33 in the housing 11 and to an annular groove 34 in the piston 12. Then the pressure passes through a port 35 in the piston 12 to a compartment 36 defined by the member 15 and the opening 13 in the piston 12 so as to make it possible to move the piston 12 rightwardly. 37 is a reservoir tank and 38 is a pump for supplying hydraulic pressure to an accumulator 41 through the intermediary of the check valve 40. The hydraulic pressure passes from said accumulator 41 through a conduit 42 and a check valve 43 to an inlet 44 in the housing 11, and then passes to an annular groove 45 in the housing 11 and to an annular groove 46 in the piston 12. An annular groove 47 in the housing 11 is connected through an outlet 48 and a conduit 49 to a wheel brake cylinder 51 of a wheel 50. The groove 47 communicates with a compartment 53 defined by the cylindrical opening 14 and the member 16 through a port 52 in the piston 12. An annular groove 54 in the housing 11 may communicate with the groove 47 through an annular groove 55 in the piston 12, and may further communicate with the reservoir tank 37 through the outlet 56 and a conduit 57. Said groove 45 can also communicate with said groove 33 through the groove 34 when the piston 12 moves to the right. A land 58 of the piston 12 is so formed as to intercept communication between the groove 33 and the groove 45, and a land 59 is so arranged as to intercept communication between the groove 45 and the groove 47 and also to intercept communication between the groove 47 and the groove 54.

An annular chamber 60 defined by the housing 11, the piston 12, the member 15, and the element 17 is, at the lower side, connected to the conduit 42 at a junction 63 between the check valve 40 and the check valve 43 through the inlet 61 and a restricted orifice 62, while at the upper side, the chamber 60 is connected to a nozzle 66 through an outlet 64 and a conduit 65. Likewise, an annular chamber 67 defined by the housing 11, the piston 12, the member 16, and the element 18 is, at its lower side, connected to the conduit 42 at the junction 63, through the inlet 68 and a restricted orifice 69, while at the upper side, the chamber 67 is connected to the nozzle 72, facing the nozzle 66, through the outlet 70 and the conduit 71. The exits of the nozzles 66 and 72 communicate with the reservoir tank 37 through a conduit not shown. The numeral 73 indicates a torque motor in which a flapper valve 74 is rotatably mounted on a fixed member, not shown, by a pin 75. One arm of the flapper valve 74 extends into a middle position between the nozzles 66 and 72 and the other arm thereof is provided with a coil 77 and extends between the magnets 76.

The coil 77 is connected to the terminals 78, 79 which are connected to a sensor for detecting the rotational state of the vehicle wheels and to a signal generator which converts the condition detected by the sensor into an electrical signal. By applying the electrical signals from the signal generator to the coil 77, the flapper 74 swings clockwise or counterclockwise around the pin 75 in proportion to the value of the electrical signals so as to vary the discharge from the nozzles 66, 72.

Figure 2:
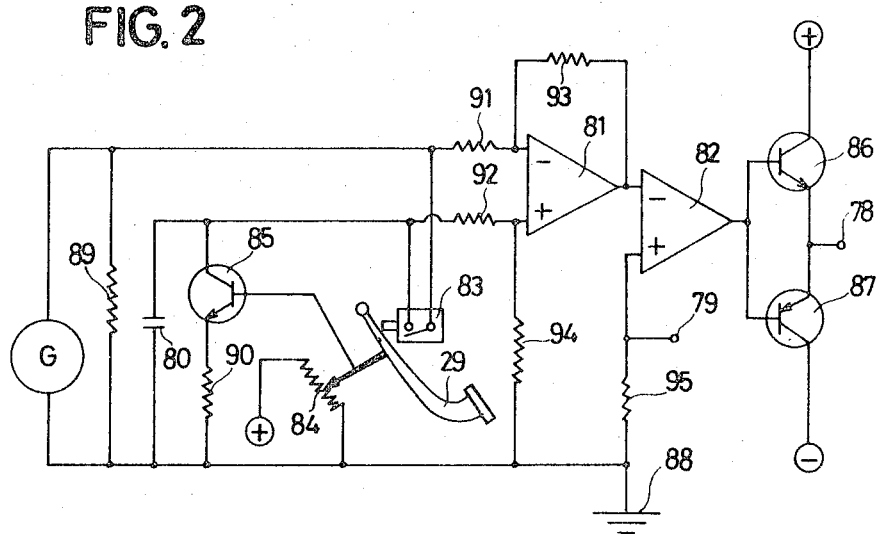
FIG. 2 is an electrical circuit diagram of an electrical signal means.

Referring now to FIG. 2 showing a known electrical signal means including a sensor and a signal-generator, the symbol G indicates a direct current generator which rotates in synchronism with the rotation of the vehicle wheel and generates direct current voltage in proportion to the vehicle speed. The numeral 81 is an operational amplifier acting as a differential amplifier for inversion and non-inversion inputs and amplifies the difference between the two inputs proportionally, a resistance 91 being equal to a resistance 92 and a resistance 93 being equal to a resistance 94. The numeral 82 denotes an operational amplifier which constitutes a constant current circuit for proportioning the voltage value of an inversion input and the current of an output. The numeral 83 is a brake-responsive switch which is closed when the brake pedal 29 is not operated and is open when the brake pedal 29 is applied as shown in FIG. 2. Resistance 84 is connected between ground and a source of positive potential represented symbolically by⊕, and a voltage tap on this resistance is connected to the base of transistor 85 and actuated by the brake pedal 29 in such manner as to vary the position thereof in accordance with the pressure applied to the pedal.

When the brake is not applied, the voltage generated by the D.C. generator G is equal to the voltage to which condenser 80 is charged. Therefore, the electric potentials at the two inputs to the operational amplifier 81 being the same, the net output of the amplifier becomes zero. Accordingly, the output current of the operational amplifier 82 which functions as a constant current circuit is also zero, and no current flows through the coil 77.

When the brake is applied the brake-responsive switch 83 becomes disengaged as shown in FIG. 2 and the variable resistance 84 moves toward the potential source side in accordance with the force applied to the brake pedal 29, so that the base potential of transistor 85 rises and the electric current flowing to the collector of the transistor 85 increases in proportion to the base potential, and the condenser 80 discharges through the collector-emitter circuit of the transister 85. Since the amount of the discharge varies in proportion to the force on the pedal 29, that is, the braking force applied by a driver, the potential charge on the condenser 80 equals the speed of the vehicle.

In case the output of the D.C. generator G responsive to the vehicle speed, is lower than the voltage on the condenser 80, that is, the vehicle speed is lower than the speed the driver requires and has excessive braking force, the output of the operational amplifier 81 is positive, and is then inverted by the operational amplifier 82, which permits the continuity through a transistor 87. Therefore, the current flows from the earth 88 to the negative side, symbol⊖, of an electric power source through a resistance 95, the terminal 79, the coil 77 the terminal 78, and the emitter-collector of the transistor 87. Since said current is proportional to the input voltage of the non-inversion owing to the feedback circuit of the resistance 95, the braking force is reduced in proportion to the current value, that is, the input voltage of the operational amplifier 81 through the counterclockwise rotation of the flapper 74.

In case the output of the D.C. generator G is higher than the voltage on the condenser 80, that is, the vehicle speed is greater than the speed the driver needs, the output of the operational amplifier 81 is negative, and is then inverted by the operational amplifier 82, which permits the continuity through the transister 86. Accordingly the current flows from the positive side ⊕ of the electric power source to the earth 88 through the collector-emitter of the transister 86, the terminal 78, the coil 77, the terminal 79 and the resistance 95. Since the current flows are reversed as compared with the foregoing case, the braking force is increased in proportion to the output voltage of the operational amplifier 81 through the clockwise rotation of the flapper 74.

According to the present invention, the pump 38 provides hydraulic pressure in the accumulator 41. This pressure is distributed three ways at the junction 63 one leading to the check valve 43, the inlet 44, and grooves 45, 46; another through the orifice 62 and the inlet 61 to the chamber 60 and then through the outlet 64 and the conduit 65 to the nozzle 66; and the third passes through the orifice 69 and the inlet 68 to the chamber 67 and then passes through the outlet 70, the conduit 71 to the nozzle 72. When the brake pedal 29 is not depressed, the piston 12 is in the position where the pressure of the compartment 36 and the chamber 60 and the pressure of the compartment 53 and the chamber 67 are equalized as shown in FIG. 1. When the brake pedal 29 is depressed, the hydraulic pressure from the master cylinder 30 passes through the conduit 31 and the inlet 32, the grooves 33, 34 and the port 35 to the compartment 36. Thus, the piston 12 moves slidably to the right within the housing 11 with the compartment 36 and the groove 34 being pressurized. By this rightward movement the land 59 establishes communication between the groove 47 and the groove 45 through the groove 46, and further since the communication with the groove 54 is intercepted by the land 59, the hydraulic pressure stored at the accumulator 41 passes through the inlet 44, grooves 45, 46 and 47, the outlet 48, the conduit 49 to the wheel brake cylinder 51 of the wheel 50. After braking, the brake pedal 29 is released, and the piston 12 returns to the position where the pressure of the compartment 36 and the chamber 60 and the pressure of the compartment 53 and the chamber 67 are equalized, that is, to the position shown in FIG. 1.

Upon braking, when the braking force is less than intended by the driver, the sensor would detect such state as before-explained and then the current flows to the coil 77 so that the flapper 74 swings in a clockwise direction around the pin 75 to increase the discharge-resistance of the fluid from the nozzle 66 and to decrease that from the nozzle 72. Accordingly, the hydraulic pressure at the nozzle 66 rises and the pressure at the nozzle 72 decreases, and the piston 12 moves to the position where the pressure in the compartment 36 and the chamber 60 and the pressure in the compartment 53 and the chamber 67 become equal. That is, the pressure in the chamber 60 increases and the pressure in the chamber 67 decreases and the pressure in the compartment 36 is constant so that the pressure in the compartment 53 increases to balance the pressure therebetween. As the groove 47 is in communication with the chamber 53, the hydraulic pressure increases in the outlet 48 and the conduit 49 and at the wheel cylinder 51. Therefore, a pressure higher than the pressure caused by depressing the brake pedal 29 is applied to the wheel cylinder 51 for increasing the braking force.

On the contrary, when a braking force is excessive, such state being detected by the sensor, current flows to the coil 77 but in the opposite direction from the above condition, and the flapper 74 swings counterclockwise around the pin 75 in accordance with the amperage so as to increase the resistance of the fluid at the nozzle 72 and to decrease the resistance at the nozzle 66, and thereby the hydraulic pressure at the nozzle 72 rises and the hydraulic pressure at the nozzle 66 decreases. The piston 12 thus moves to the left owing to the increase in the pressure, and the groove 47 communicates with the groove 54 through the groove 55 due to the leftward movement of the land 59, so that the hydraulic pressure in the groove 47 is directed to the reservoir tank 37 through the conduit 57. Also the hydraulic pressure in the compartment 53 decreases so that pressure in compartment 36 and the chamber 60 and the pressure in the compartment 53 and the chamber 67 becomes equalized. The decrease of the pressure in the compartment 53 is transmitted through the port 52 to the groove 47. The hydraulic pressure of the wheel brake cylinder 51 decreases until it is lower than the brake pressure due to the force on the brake pedal 29 and the braking force on the wheel 50 is decreased for preventing the wheels from locking.

Furthermore, when the hydraulic pressure is not stored in the accumulator 41, and when the brake pedal 29 is depressed, the hydraulic pressure from the master cylinder 30 permits the piston 12 to move further to the right, so that the groove 33 may communicate with the wheel cylinder 51 through the groove 34, grooves 45, 46, 47, the outlet 48 and the conduit 49, and since the hydraulic pressure is not drained from the groove 45 by the check valve 43, the wheel 50 is braked by applying hydraulic pressure from the master cylinder 30 to the wheel cylinder 51. Therefore, even if the predetermined hydraulic pressure should not be stored in the accumulator 41 owing to failure of the pump 38 or the like, safety is assured.

It is to be understood that it is possible to automatically control the running state of the vehicle with controlling the engine or the transmission by applying the apparatus of the present invention to the accelerator pedal or clutch pedal, without limiting the hydraulic pressure control system as described in the foregoing embodiment.

What is claimed is:

1. An apparatus for controlling the hydraulic pressure in a control system for controlling a vehicle comprising
    a first source of fluid under pressure responsive to the operation of a pedal,
    a second source of fluid under pressure,
    an actuator means responsive to fluid pressure for controlling the vehicle,
    an electrically operated signal means responsive to the rotational state of a vehicle wheel for varying the fluid pressure on said actuator means,
    and a servo valve, said servo valve comprising,
    a cylinder housing having closed end walls,
    a piston slidably fitted within said cylinder housing and having an opposed opening at each end thereof,
    a pair of longitudinal members, one end of each member being mounted in each opposed opening in said piston, and the other ends of said members being affixed to the closed ends of said cylinder housing, the inner ends of said longitudinal members being spaced from the inner ends of the opposed openings in said piston to form two compartments,
    a first passageway for connecting one of the compartments to said first source of fluid under pressure,
    a second passageway for connecting the other compartment to said actuator means,
    a third passageway for connecting the other compartment to a drain, said third passageway being closed to the drain when fluid pressure is applied from said first source through said first passageway to move said piston and to open said second passageway to actuate said actuator means by fluid pressure,
    a fourth passageway for connecting the other compartment to said second source of fluid under pressure,
    the opposed outer ends of said piston being spaced from the closed ends of said cylinder housing to form opposed chambers, said chambers being connected to said second source of fluid pressure and to said electrically operated signal means,
    said signal means including means to vary the fluid pressure in said chambers in accordance with the state of rotation of the wheel of the vehicle to increase or decrease the fluid pressure in the other compartment by varying the movement of said piston and thus vary the pressure applied to said actuator means.

2. An apparatus as claimed in claim 1 and further comprising a check valve disposed in said fourth passageway so that when said piston moves to connect said first passageway to said actuator means through said second and fourth passageways, said actuator means can be operated even when said second source of fluid under pressure fails.

3. An apparatus as claimed in claim 1 and further comprising passageways for connecting said chambers to said second source of fluid under pressure and orifice means disposed in said last mentioned passageways.

4. An apparatus as claimed in claim 1 wherein said signal means includes a flapper valve actuated by said signal means for controlling the respective pressures in said chambers.

* * * * *